United States Patent [19]

Magherini

[11] 4,160,636

[45] Jul. 10, 1979

[54] INJECTION MOLDING APPARATUS FOR THE MANUFACTURE OF ZIPPERS

[76] Inventor: Dino Magherini, Via Osservatorio 36, Florence, Italy

[21] Appl. No.: 837,149

[22] Filed: Sep. 27, 1977

[30] Foreign Application Priority Data

Sep. 30, 1976 [IT] Italy ................................ 9607 A/76
Sep. 20, 1977 [IT] Italy ................................ 9573 A/77

[51] Int. Cl.² .......................... B29D 5/00; B29F 1/00
[52] U.S. Cl. ................................ 425/129 R; 425/814
[58] Field of Search ................ 425/129 R, 814; 264/259, 271, 251, 254, 328, 252

[56] References Cited

U.S. PATENT DOCUMENTS

| | | | |
|---|---|---|---|
| 2,197,968 | 4/1940 | De Mattia | 425/129 |
| 2,279,344 | 4/1942 | Reid | 264/329 |
| 2,282,308 | 5/1942 | Dahlin | 425/814 |
| 2,511,402 | 6/1950 | Firing | 425/129 |
| 2,744,289 | 5/1956 | Wanders | 425/129 |
| 3,097,395 | 7/1963 | Yoshida | 425/129 |
| 3,196,196 | 7/1965 | Burbank | 425/814 |

*Primary Examiner*—W. E. Hoag
*Attorney, Agent, or Firm*—Haseltine, Lake & Waters

[57] ABSTRACT

Apparatus for the manufacture of zippers comprising a vertically disposed rotor driven about its vertical axis intermittently and carrying a plurality of molds. Each mold has two mold sections, one fixed and the other movable for opening and closing the mold. The rotor is intermittently advanced past an injection station and material is injected into the molds successively to form a continuous length of injection-molded teeth on a ribbon. The fixed mold section of each is secured to the rotor and the movable mold section is pivotably connected to the rotor at the lower end of the movable mold section.

9 Claims, 9 Drawing Figures

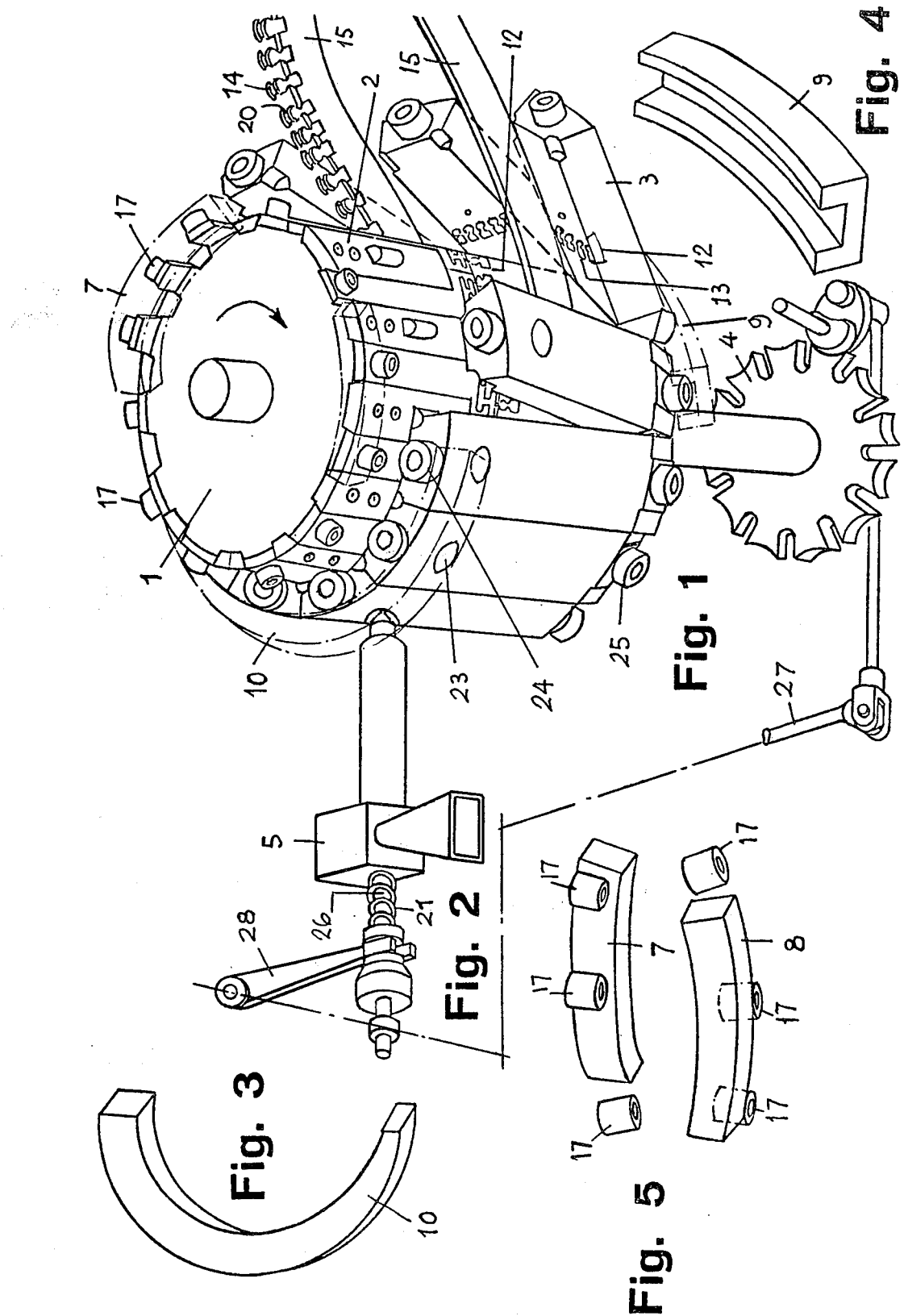

1

INJECTION MOLDING APPARATUS FOR THE MANUFACTURE OF ZIPPERS

FIELD OF THE INVENTION

The invention relates to apparatus for the manufacture of zippers.

PRIOR ART

A great number of zippers are known for use on clothing leather goods and footwear. The zippers can have teeth made of metal or metal alloy or plastic material. The zippers with plastic teeth are made by hot pressing according to the injection technique used for the manufacture of thermoplastic materials where the working speed is conditioned by the time necessary for the cooling and solidification of the material injected in the mold. For this reason, presses in use at present for the injection molding of the zipper with plastic teeth require considerable capacity because it is necessary to adopt a mold with a large number of recesses or impressions to obtain, for each injection, a considerable length of zipper. Nevertheless, the advancement of the ribbon on which the teeth are molded is necessarily intermittent and also slow.

SUMMARY OF THE INVENTION

An object of the present invention is to provide injection molding apparatus associated for manufacturing zippers having especially, but not exclusively plastic teeth, the main characteristic of said apparatus being a substantial output.

To obtain such results, it is contemplated according to the present invention to effect the injection molding with a slight intermittence, in a plurality of closable molds, circularly located on a rotor, where the injection is effected in each mold only once during a rotor revolution. Consequently, each mold forms a small length of the zipper strip during every revolution of the rotor and said mold remains closed for a fraction of a revolution to permit cooling and solidification of the injected material.

The apparatus of the present invention provides a number of advantages, one of which is the small amount of time taken by a direct or indirect injection thus reducing the time necessary for the cooling of the injected material. The material can be a thermoplastic resin or a metal alloy such as zamak and the like.

A further advantage of the apparatus of the invention, partly as a consequence of the one mentioned above, is the high frequency of the injection which contributes to the regularity and constancy of that operation, even with injection openings of small section as the residual material in the injector has no time to solidify.

Another advantage that is the direct consequence of the preceding ones is the high speed of the advancement of the ribbon on which the teeth are being molded.

Another advantage of the is that the machine is simple in construction and operation and has a cost of manufacture which is lower than that of conventional machines of the same capacity.

Another advantage is the great flexibility of the machine because it permits further applications such as the manufacture of single pieces i.e. teeth.

BRIEF DESCRIPTION OF THE DRAWINGS

FIG. 1 is a perspective view of the rotor assembly and drive means thereof.

FIG. 2 is a perspective view of the injection device in operative position with respect to the rotor.

FIG. 3 shows the cam for closing the molds in separated fashion.

FIG. 4 shows the cam for opening the molds in separated fashion.

FIG. 5 shows details of the cams for displacing the slide with the injection channels in separated fashion.

DETAILED DESCRIPTION

Figure 6:
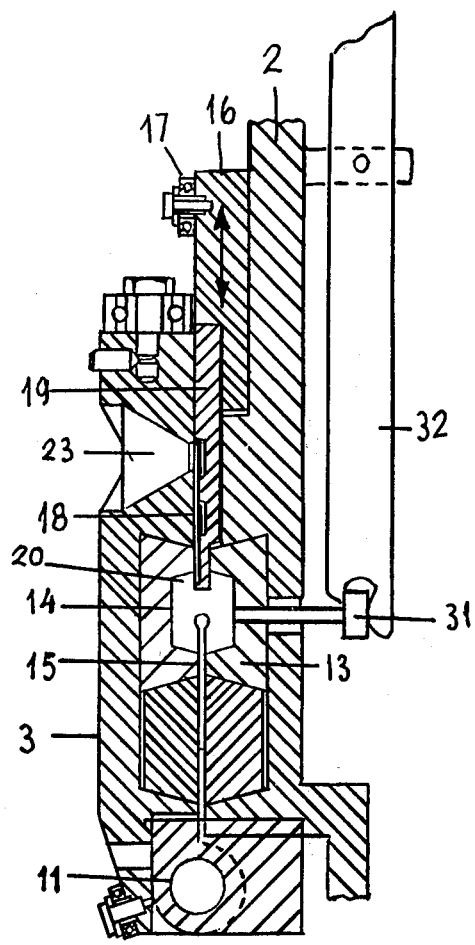
FIG. 6 is a longitudinal sectional view of a detail of the closed mold after injection.

The machine for manufacturing zippers by the injection molding method essentially comprises the following main components:

(a) rotor 1 having a vertical axis and driven intermittently. The rotor 1 supports a plurality of removable molds each comprising vertical mold sections 2, 3;

(b) a Maltese cross cam 4 for the control of the intermittent movement of the rotor;

(c) two fixed cams 7,8 for controlling movement of a plate 19 having injection channels;

(d) two fixed cams 9,10 for controlling opening and closing of the molds;

(e) a thermoplastic injector 5 having a piston driven in alternative rectilinear movement by the Maltese cross cam; and (f) a device 6 for interrupting the injection to produce portions of zippers without teeth.

Figure 7:
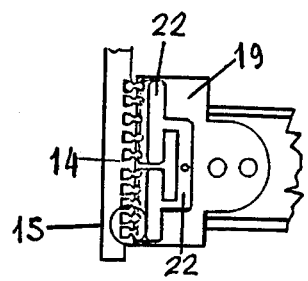
FIG. 7 is a plan view of a detail showing the plate with the injection channels.
Figure 9:
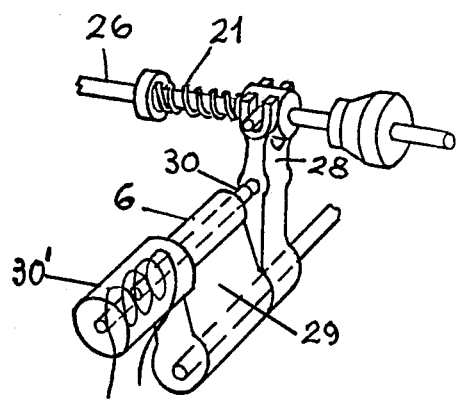
FIG. 9 is a perspective view of a unit for interrupting the injection.
Figure 8:
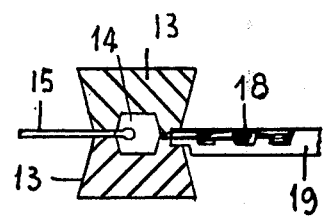
FIG. 8 is a longitudinal sectional view of a detail of a variation of the plate.

In greater detail, the mold sections 2 are integral with the rotor 1 and the mold sections 3 are pivotable with respect to the sections 2 by being mounted on a lower horizontal hinge pin 11, so as to permit the opening and the closing of the molds. Each of the mold sections 2,3 is provided, at the opposite faces, with a removable die 12 having recesses or impressions 13 for the formation of zipper teeth 14 by direct molding on a continuous cloth ribbon 15 or the like, by supply of thermoplastic material form an injection channel. For this purpose each of said fixed mold sections 2 is provided with a vertical slide plate 16 longitudinally movable in opposite direction by means of the combined effect of the circular movement of the rotor and the contact of a roller 17, integral with slide plate 16 with the two fixed cams 7,8, suitably shaped with a convex active profile. The cam 7 produces down-stroke of the slide plate 16 for the molding operation and the cam 8 produces lifting movement of the plate 16 for separation of a feedhead or flashing 18. A plate 19 is integral with slide 16 and the lower free end of plate 19 forms a groove 20 in the teeth 21 of the zipper that is being produced. The plate 19 has an active front surface provided with recesses 22 serving as injection channels where residual thermoplastic material forming the feedhead or flashing is cut by the plate 19 by the effect of the movement of the latter during the lift-stroke of the slide 16. The residual material is ejected automatically by the opening of the mold. FIG. 7 shows in plan view a detail of the plate 19 and therein can be seen the recesses 22 forming the injection channels. FIG. 8 shows in longitudinal section view a detail of a variant of plate 19 for a different configuration of the zipper teeth.

Each of the movable mold sections 3 is advantageously provided with a transverse bore 23 for the injection of the material forming the teeth zipper.

The mold sections 3 are provided with rollers 24,25, the rollers 24 being rotatable around horizontal axis and, located at the top of sections 3 while rollers 25 are rotatable about an inclined axis near the bottom, of the mold sections 3. The rollers 24, 25 operate to effect the closing and the opening the closing and the opening of the movable mold sections 3 by the combined effect of the circular movement of rotor 1 and the contact of the rollers 24,25 with the two fixed cams 9,10 of a concave active shape. The rotor is driven from to an electric motor (not shown) via the Maltese cross cam 4 to undergo an intermittent rotation having steps corresponding to the molds and at a frequency corresponding to the injection. The injection device 5 of the thermoplastic material is of a known type and is provided with piston 26 driven reciprocally in synchronism with rotor 1 by a level system 27 which receives movement from the Maltese cross cam 4 and transmits the movement to a lever 28 to produce synchronized active strokes of the piston 26. A return spring 21 produces return movement of the piston during the inactive stroke.

The apparatus further comprises a device for forming portions of ribbon zipper without teeth including means for interrupting the injection of material for producing the teeth and which operates on the injector piston to make it inactive. In particular, such means comprises a fixed arm 29 adjacent lever 28 and having a pin 30 longitudinally slidable in a direction perpendicular to the plane of oscillation of lever 28 to selectively halt the stroke of the lever. This is achieved by displacing pin 30 beyond its normal rest position under the action of an electromagnet 30 that is selectively operated in accordance with a suitable program by known means.

The machine of the invention can advantageously be utilized with molds having dies with impressions of a form changeable as desired and also without using a continuous ribbon. In this case, the molds permit the production of single pieces, as for example, teeth and the like, for the removal of which a kick-device 31 is provided for effecting the ejection, with the mold in open position, by means of conventional levers 32 or the like.

The operation is as follows:

The ribbon is introduced in horizontal position into the molds and conveyed by the rotor movement between gradually closable between adjacent mold sections which are progressively closed by the effect of the contact of the roller 24 with the cam 10. The ribbon then passes in front of the injection station where it receives the thermoplastic material or metal alloy that forms a small strip of teeth according to the shape of the mold impressions. The ribbon is then advanced with the closed molds for a fraction of a revolution corresponding to a time sufficient for the solidification of the formed teeth and finally the ribbon with the teeth molded thereon is ejected from the molds which are opened by the effect of the contact of the rollers 25 with the cam 9. The positioning of the plate 19 with the injection channels 22 takes place simultaneously with the setting of the ribbon by means of the contact of the rollers 17 with the cam 8. The plate 19 undergoes upward movement at an instant before the opening of the molds for the removal of the manufactured ribbon. This movement of the plate 19 is effected by means of contact effect of the rollers 17 with the cam 7. By interrupting the operation of injector 5 selectively, the ribbon cam remains undressed i.e. formed without teeth.

What is claim is:

1. Apparatus for the manufacture of zippers comprising a rotor having a vertical axis, means for intermittently rotating said rotor around said vertical axis, a plurality of molds carried by said rotor, each mold including two mold sections one being fixed and the other movable to open and close the mold, and an injection station adjacent said rotor including means for injecting material into the molds as they successively pass the injection station, said fixed mold section being secured to the rotor, said movable mold section including a hinge connection with said rotor at the lower end of the movable mold section.

2. Apparatus as claimed in claim 1 wherein said mold sections respectively include removable dies.

3. Apparatus as claimed in claim 1 comprising kick means for ejecting molded articles from the opened molds.

4. Apparatus as claimed in claim 1 wherein said means for injecting material into the molds comprises a slide movably supported by each respective fixed mold section for vertical movement, a plate secured to said slide, means for moving said slide and said plate therewith between a lower position and a raised position, said plate having recesses defining injection channels, said plate having a lower end which in said lower position projects into the cavity of the mold to form grooves in the teeth being molded, the movement of the plate from the lower to the raised position causing separation of the teeth from the material remaining in the injection channels.

5. Apparatus as claimed in claim 4 wherein the movable mold section has a transverse bore for conveying injection material to the injection channels of the fixed mold section.

6. Apparatus as claimed in claim 5 comprising means for opening and closing each movable mold comprising two cam tracks, and two rollers on each movable mold respectively engaged with one said cam track.

7. Apparatus as claimed in claim 5 wherein said means for injecting material comprises an injector coupled to said transverse bore, said injector including a piston, and means drivingly coupling said piston with the means for intermittently rotating the rotor.

8. Apparatus as claimed in claim 7 comprising means for selectively interrupting the stroke of the piston.

9. Apparatus as claimed in claim 8 wherein the means drivingly coupling said piston with the means for intermittently rotating the rotor comprises a pivotal lever for displacing the piston, said means for selectively interrupting the stroke of the piston comprising a slidable pin engageable with the pivotal lever to block travel thereof, and control means for displacing the pin to engage the pivotal lever.

* * * * *